United States Patent
Baligh et al.

(10) Patent No.: US 8,867,503 B2
(45) Date of Patent: Oct. 21, 2014

(54) LOCALIZED COMP PRECODING

(75) Inventors: Mohammadhadi Baligh, Ottawa (CA);
Jianglei Ma, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 127 days.

(21) Appl. No.: 13/587,805

(22) Filed: Aug. 16, 2012

(65) Prior Publication Data

US 2014/0050202 A1 Feb. 20, 2014

(51) Int. Cl.
*H04J 3/00* (2006.01)
*H04W 72/12* (2009.01)
*H04W 28/02* (2009.01)

(52) U.S. Cl.
CPC ...... *H04W 72/1226* (2013.01); *H04W 28/0231* (2013.01)
USPC .......................................... 370/336; 455/450

(58) Field of Classification Search
CPC ....................... H04W 72/1226; H04W 28/0231
USPC ......... 370/328–329, 335–336, 338, 342–343, 370/345, 347, 437, 441–442, 479–480; 455/450–451, 452.1–452.2
See application file for complete search history.

(56) References Cited

U.S. PATENT DOCUMENTS

| | | | |
|---|---|---|---|
| 8,305,987 B2 * | 11/2012 | Fong et al. | 370/329 |
| 8,514,826 B2 * | 8/2013 | Han et al. | 370/338 |
| 8,599,715 B2 * | 12/2013 | Kim et al. | 370/252 |
| 8,643,366 B2 * | 2/2014 | Takai | 324/314 |
| 2010/0113059 A1 * | 5/2010 | Morimoto et al. | 455/452.2 |
| 2010/0285810 A1 * | 11/2010 | Ko et al. | 455/450 |
| 2010/0322351 A1 | 12/2010 | Tang et al. | |
| 2012/0004014 A1 * | 1/2012 | Ding et al. | 455/561 |
| 2012/0034926 A1 * | 2/2012 | Damnjanovic et al. | 455/450 |
| 2012/0099470 A1 * | 4/2012 | Li et al. | 370/252 |
| 2013/0121312 A1 * | 5/2013 | Roman et al. | 370/335 |
| 2013/0156010 A1 * | 6/2013 | Dinan | 370/335 |
| 2013/0195080 A1 * | 8/2013 | Kang et al. | 370/335 |
| 2013/0201931 A1 * | 8/2013 | Noh et al. | 370/329 |

FOREIGN PATENT DOCUMENTS

| | | |
|---|---|---|
| CN | 101771507 A | 7/2010 |
| CN | 101888665 A | 11/2010 |
| CN | 102013952 A | 4/2011 |

* cited by examiner

Primary Examiner — Kevin Mew (57) ABSTRACT

A system is provided for precoding in a coordinated multi-point (CoMP) joint transmission (JT) system. During operation, the system identifies, at a first base station (BS) of a first cell, a set of regular user equipments (UEs), which are located within the first cell and receive signals from the first BS; and one or more coordinated multipoint (CoMP) UEs, which are located within a second cell and receive signals. The CoMP UEs receive signals from both the first BS and a second BS of the second cell. The system obtains a first channel state information (CSI) associated with the regular UEs, receives a second CSI associated with the CoMP UEs from the second BS, and constructs a local precoder for the first cell in accordance with the first CSI and the second CSI.

22 Claims, 6 Drawing Sheets

LOCALIZED COMP PRECODING

BACKGROUND

1. Field

This disclosure is generally related to precoding in Coordinated Multi-Point (CoMP) joint transmission (JT) systems. More specifically, this disclosure is related to a method and an apparatus for designing a precoder in accordance with local parameters.

2. Related Art

Multiple-input-multiple-output (MIMO) systems have tremendous potential in increasing the average throughput in cellular wireless communication systems. The performance gain in channel capacity, reliability, and spectral efficiency in single user (point-to-point) MIMO (SU-MIMO) systems has spurred the inclusion of SU-MIMO in various cellular and wireless communication standards. In cellular networks where spectrum scarcity/cost is a major concern, the ability to reuse spectrum resources is critically important. To further increase spectral efficiency in cellular networks, the spatial diversity of the users can be exploited to allow multi-user MIMO (MU-MIMO) transmissions. The recently emerged 3GPP ($3^{rd}$ generation partnership project) long-term evolution (LTE) and LTE Advanced standards have integrated various MU-MIMO techniques. In addition, CoMP has been promoted as a way to improve coverage, cell-edge throughput, and system efficiency by 3GPP.

In a system implementing CoMP, multiple cells cooperate together to serve certain user equipments (UEs). For example, when a UE is in the edges of multiple cells, it may receive signals from multiple cell sites and its transmitted signals may be received at the multiple cell sites. Hence, if the signaling transmitted from the multiple cell sites is coordinated, the downlink (DL) performance can be improved significantly. In DL CoMP, a number of approaches have been considered, including dynamic cell (or transmission point) selection, coordinated beamforming (CBF), coordinated beam switch, joint transmission (JT), etc. In CBF, the transmission to a single UE is transmitted from the serving cell as in the case of non-CoMP transmission. However, the beamforming is dynamically coordinated between the cells in order to reduce interference. In JT, the transmission to a single UE is simultaneously transmitted from multiple transmission points, across cell sites.

In conventional approaches, precoding in the CoMP JT systems is performed globally. In other words, all cell sites within the CoMP sites are taken into account in the precoder calculation. A number of challenges remain for such global approaches, including reliance on accurate inter-cell phase synchronization, the requirement of high-order matrix calculation, and reliance on relatively accurate channel state information (CSI), which may not be available in the frequency-division duplexing (FDD) cases. Moreover, global precoding approaches also require transmitted data streams and CSI to be shared among all cells in the CoMP set. As the CoMP set gets larger, the need for pairing users also increases, requiring more demodulation reference signal (DMRS) overhead and signaling.

SUMMARY

One embodiment of the present invention provides a system for precoding in a coordinated multipoint (CoMP) joint transmission (JT) system. During operation, the system identifies, at a first transmit point of a first cell, a first set of user equipments (UEs), which are located within the first cell and receive signals from a first transmit point of the first cell; and a second set of UEs, which are located within a second cell and receive signals. The second set of UEs receive signals from both the first transmit point and a second transmit point of the second cell. The system obtains a first channel state information (CSI) associated with the first set of UEs, receives a second CSI associated with the second set of UEs, and constructs a local precoder for the first cell in accordance with the first CSI and the second CSI.

In a variation on this embodiment, the system determines whether one or more conditions associated with the first transmit point and the second transmit point have been met. In response to the conditions being met, the system constructs a global precoder for the first cell and the second cell.

In a further variation, the one or more conditions include: backhaul capability between the first transmit point and the second transmit point substantially satisfying a need, available processing capability exceeding a threshold, synchronization level between the first transmit point and the second transmit point exceeding a threshold, and channel feedback information for the first cell and the second cell being substantially accurate.

In a further variation, constructing the global precoder involves signaling on an X2 interface between the first transmit point and the second transmit point.

In a variation on this embodiment, the first transmit point and the second transmit point are located at different cell sites.

In a variation on this embodiment, the system assigns power transmitted from the first transmit point to the first set of UEs independently of power assignment in the second cell.

In a variation on this embodiment, the system splits power transmitted to the second set of UEs between the first transmit point and the second transmit point in accordance with corresponding reference signal received powers (RSRPs) reported by the second set of UEs.

In a variation on this embodiment, the precoder is a zero-forcing precoder.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a method and a system for efficient precoding in CoMP JT systems. More specifically, individual local precoders are derived for each transmit point (or for each individual cell site). While deriving the local precoders, only local parameters, such as channel state information (CSI) within a cell site and CSI for UEs participating in the CoMP transmission of that cell site, are considered. Moreover, UE power assignment can be determined in accordance with the local parameters. Some embodiments also support hybrid precoding or adaptive precoding. In the mode of hybrid precoding, in addition to deriving per-cell-site precoders, the system may also derive one or more precoders for groups of cell sites, given that certain conditions (such as synchronization within a group of cell sites) are met. In the mode of adaptive precoding, the system may derive local, per-cell-site precoders or a global precoder in accordance with a number of criteria, such as backhaul capability, inter-site synchronization accuracy, and processing capability.

In this disclosure, the term "node" refers to an entity in the network capable of sending, receiving, or forwarding information over a communication channel. In a wireless communication network, a node can refer to a base station (such as an LTE eNode-B), which serves as the hub of a local network; or a piece of user equipment (UE).

Localized Precoding for CoMP JT

Figure 1:
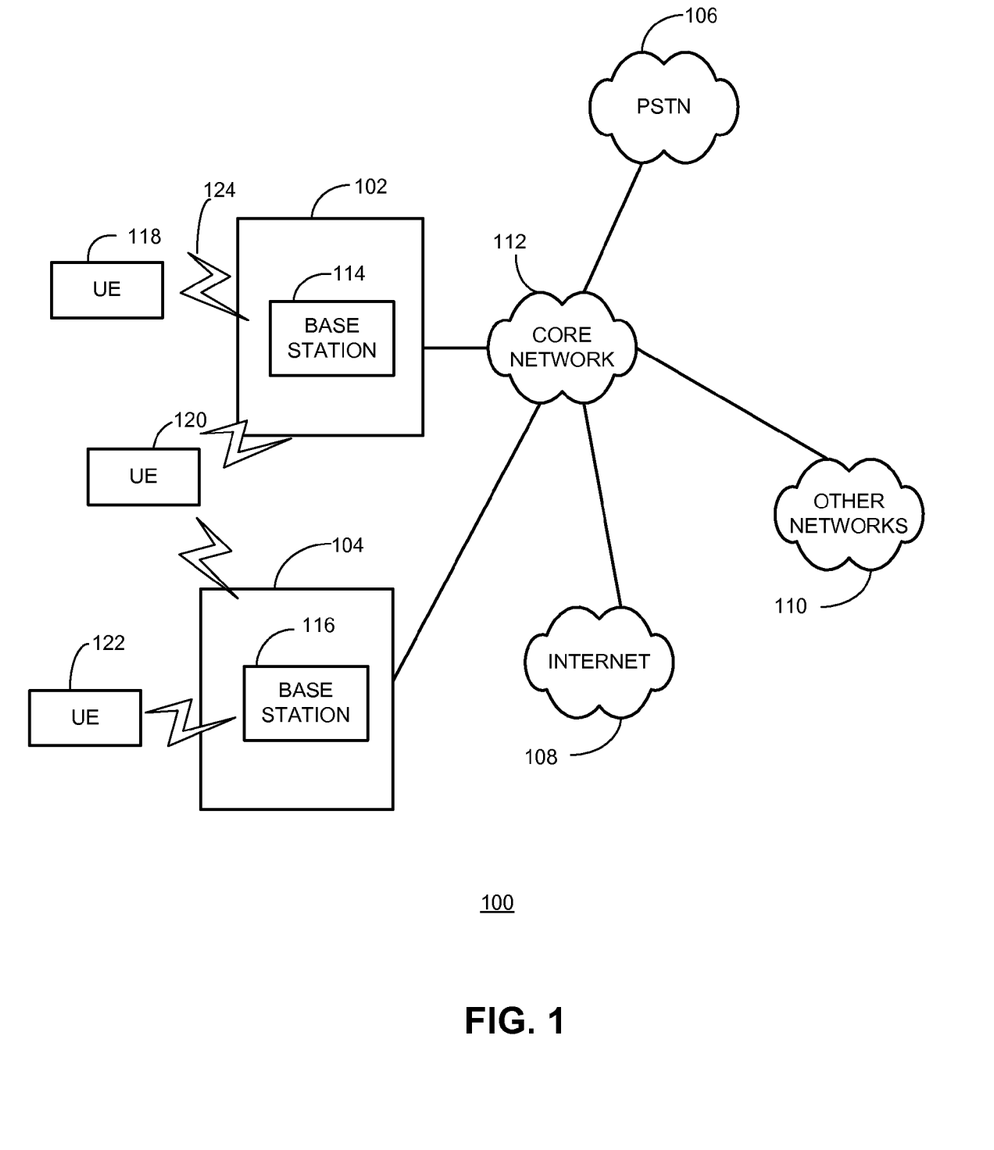
FIG. 1 presents a diagram illustrating an exemplary wireless communication system.

FIG. 1 presents a diagram illustrating an exemplary wireless communication system. In general, wireless communication system 100 enables multiple wireless users to transmit and receive data and other content. Communication system 100 may implement one or more channel access technologies, such as code division multiple access (CDMA), time division multiple access (TDMA), frequency division multiple access (FDMA), orthogonal FDMA (OFDMA), or single-carrier FDMA (SC-FDMA).

In the example shown in FIG. 1, communication system 100 includes user equipments (UEs) 118, 120, and 122; radio access networks (RANs) 102 and 104; a core network 112; a public switched telephone network (PSTN) 106; the Internet 108; and other networks 110. While certain numbers of these components or elements are shown in FIG. 1, any number of these components or elements may be included in communication system 100.

UEs 118-122 are configured to operate and/or communicate in communication system 100. For example, UEs 118-122 are configured to transmit and/or receive wireless signals. Each UE represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

RANs 102 and 104 include base stations 114 and 116, respectively. Each base station is configured to wirelessly interface with one or more of the UEs 118-122 to enable access to the core network 112, PSTN 106, the Internet 108, and/or other networks 110. For example, base stations 114-116 may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router.

In the example shown in FIG. 1, base station 114 forms part of RAN 102, which may include other base stations, elements, and/or devices. Also, base station 116 forms part of the RAN 104, which may include other base stations, elements, and/or devices. Each base station operates to transmit and/or receive wireless signals within a particular geographic region or area, sometimes referred to as a "cell." In some embodiments, multiple-input multiple-output (MIMO) technology may be employed, where each base station and/or each UE may include a plurality of antennas.

Base stations 114-116 communicate with one or more of the UEs 118-122 over one or more air interfaces, such as air interface 124, using wireless communication links. The air interfaces may utilize any suitable radio access technology.

It is contemplated that system 100 may use multiple channel access functionality, including such schemes as described above. In some embodiments, the base stations and UEs implement LTE, LTE-A, and/or LTE-B. Other multiple access schemes and wireless protocols may be utilized.

RANs 102-104 are in communication with core network 112 to provide the UEs 118-122 with voice, data, applications, Voice over Internet Protocol (VoIP), or other services. RANs 102-104 and/or core network 112 may be in direct or indirect communication with one or more other RANs (not shown). Core network 112 may also serve as gateway access for other networks (such as PSTN 106, Internet 108, and other networks 110). In addition, some or all of the UEs 118-122 may include functionality for communicating with different wireless networks over different wireless links using different wireless technologies and/or protocols.

Among various technologies for improving spectral efficiencies, MIMO technology has attracted attention because it offers significant increases in data throughput and link range without additional bandwidth or increased transmit power. It achieves this goal by spreading the same total transmit power over the multiple antennas. MIMO, particularly multi-user MIMO (MU-MIMO), technology has been an integral part of the Long Term Evolution (LTE) standards as specified in the 3GPP (3rd Generation Partnership Project) Release 8 to Release 10, which are available at the 3GPP website (www.3GPP.org). To improve coverage, cell-edge throughput, and system efficiency, CoMP JT technology can be implemented in an LTE network.

By coordinating and combining signals from multiple antennas, CoMP JT allows mobile users of a cellular network to enjoy consistent performance and quality whether they are at the center of a cell or at its outer edges. More specifically, it allows a UE at the cell-edge to receive coordinated signals from multiple cell sites, thus significantly increasing the downlink performance.

Figure 2:
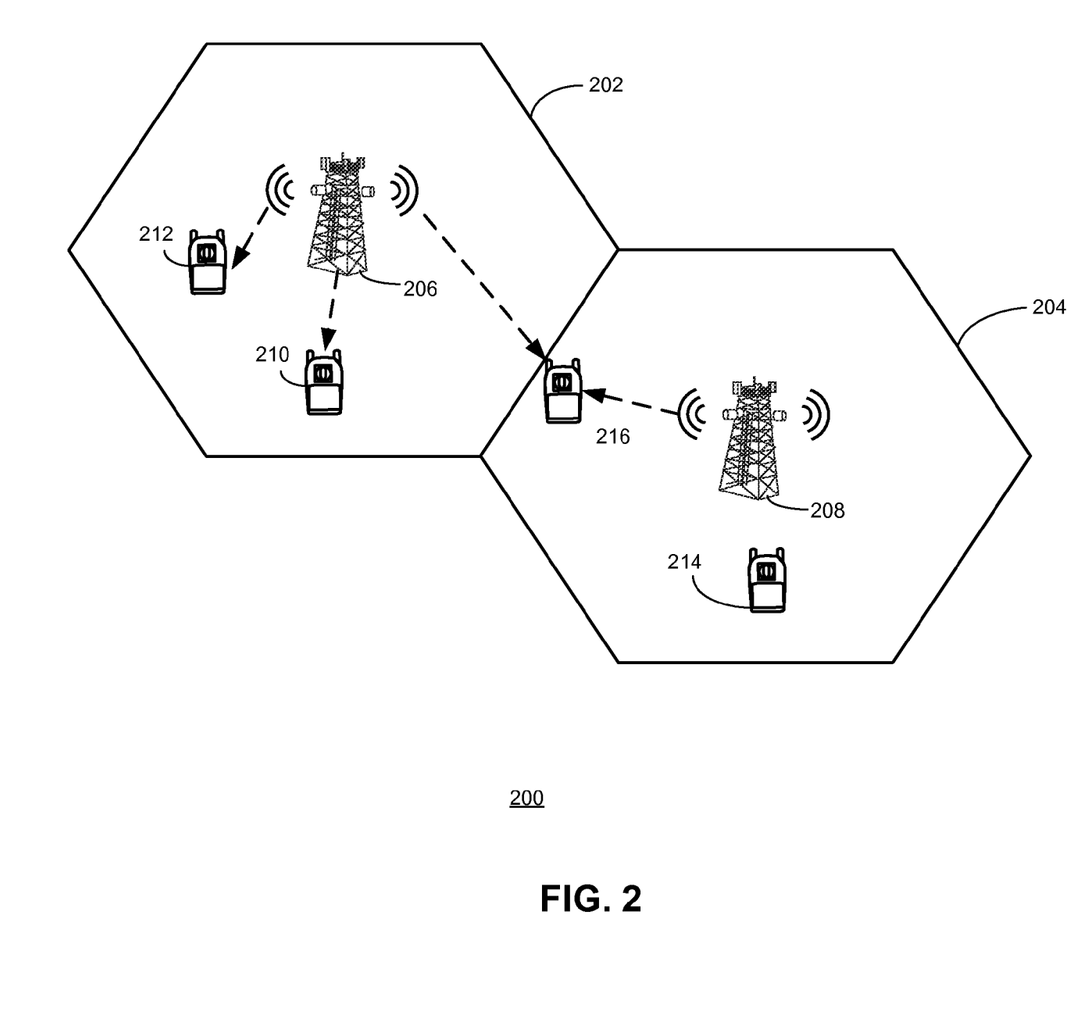
FIG. 2 presents a diagram illustrating an exemplary system implementing coordinated multipoint (CoMP) joint transmission (JT).

FIG. 2 presents a diagram illustrating an exemplary system implementing CoMP JT. CoMP JT system 200 includes a number of cells, such as cells 202 and 204. Each cell includes a base station (BS), which communicates with a number of UEs within the cell. For example, cell 202 includes a BS 206, and cell 204 includes a BS 208. BSs 204 and 206 are located at different cell sites. BS 206 communicates with UEs in cell 202, including UEs 210 and 212. Similarly, BS 208 communicates with UEs in cell 204, including UEs 214 and 216. Note that UE 216 is at the edge between cell 202 and cell 204; under CoMP JT, UE 216, in fact, receives coordinated transmissions from both BS 206 and BS 208.

To maximize the system throughput and to reduce interference, precoding is needed at both the transmitter side and the receiver side. The conventional approach for precoding in CoMP JT system 200 can be very complex because it is a global approach which uses multi-cell channel information. More specifically, channel information associated with every single active component (including UEs and BSs) within the CoMP JT system is considered in the global precoding calculation, which results in a giant channel matrix of size $K \times M \times N_{TX}$, where K is the number of active users, M is the size of the CoMP set, and $N_{TX}$ is the number of transmit antennas in each cell. In the example shown in FIG. 2, the CoMP set includes two cell sites, and the components involved include two BSs and four UEs (assuming all UEs are active). To calculate a precoder that can optimize the system throughput, such as a zero-forcing precoder, accurate CSI knowledge for all active channels within CoMP JT system 200, including channels from BS 206 to all four UEs and channels from BS 208 to all four UEs, is needed. The corresponding channel matrix involved in the downlink precoding calculation can be expressed as: $H=[H_1^T, H_2^T, H_3^T, H_4^T]^T$, where $H_k$, k=1, 2, 3, 4, refers to individual channel matrices associated with each of the four receivers (or UEs). As one can see, the size of the matrix increases as the CoMP set gets larger (for CoMP JT, the number of cells may reach 10), resulting in very high-order matrix calculation being needed in the precoding calculation. Moreover, as the number of cells increases, the scheduling complexity also grows fast. Other challenges facing the global precoding approach include synchronization mismatch between cell sites because the difference in signal arrival time can result in a linear phase drift, which can lead to interference leakage among the UEs. In addition, including multiple cell sites in the precoding calculation also makes the precoding more sensitive to channel aging, since such sensitivity is more severe for the remote radio head (RRH) scenario (as in the case of CoMP JT) compared to the scenario of co-located antennas. Another drawback of global precoding for a CoMP JT system is that it requires MU-MIMO transmission. Otherwise, the system capacity may suffer.

To mitigate the aforementioned problems involved in the precoding calculation, in embodiments of the present invention, the system performs the precoding calculation on a local scale. In other words, instead of performing a single global precoding calculation that has to consider all channel information, multiple independent precoding calculations are performed, each calculation involving a local subset of channel information. In one embodiment, per-transmission-point precoding calculations are performed. More particularly, the realm of each local precoding calculation only covers a cell (including BS and UEs within the cell) and UEs from neighboring cell sites that receive CoMP JT signals from the current cell site.

Considering the example shown in FIG. 2, instead of performing a single global precoding calculation, two independent precoding calculations are performed, one for each cell. More particularly, the precoding calculation for cell 202 considers BS 206, UEs 210 and 212 (which belong to cell 202), and UE 216 (which belongs to cell 204 but receives CoMP JT signals from BS 206). In other words, the channel matrix involved in the precoding calculation can be expressed as: $H=[H_{11}^T, H_{21}^T, H_{31}^T]^T$, where $H_{k1}$,k=1, 2, 3 refers to the channel matrix for the channel between BS 206 and each of the three receiving UEs (UEs 210, 212, and 216). Similarly, the channel matrix involved in the precoding calculation for cell 204 can be expressed as: $H=[H_{32}^T, H_{42}^T]^T$, where $H_{k2}$, k=3, 4 refers to the channel matrix for the channels between BS 208 and each of the two receiving UEs (UEs 214 and 216). The resulting local precoders (one for each cell site) can significantly improve the throughput for CoMP JT system 200 while avoiding some or all of the problems encountered by the global precoding calculation. One can see that the channel matrices involved in the local precoding calculations have a much lower order compared with the channel matrix used in the global precoding calculation, thus making precoding less computationally costly. The precoding complexity is also lowered because it is no longer increases along with the size of the CoMP set.

Moreover, because calculating a local precoder only involves UEs that participate in the CoMP JT, less data needs to be shared between neighboring cell sites. In the example shown in FIG. 2, instead of sharing data, including channel feedback information, for all UEs between cells 202 and 204 as in the case of the global precoding calculation, only data for CoMP UE 216 needs to be shared. The reduced needs for data sharing and the lowered precoding complexity lead to lowered backhaul requirements between BS 206 and BS 208. In some embodiments, the CSI knowledge for some UEs from neighboring cells is only used to improve modulation coding scheme (MCS) adaptation and/or coordinated beamforming (CBF). Moreover, because the local precoding only involves a single transmission point (a single BS), inter-site phase information is not needed in the precoding calculation. As a result, it is more robust against synchronization errors among cell sites. For example, a small phase mismatch between two cooperating cells (such as between 20° and 30°) can result in leakage among co-paired users with global zero-forcing. However, such phase mismatch may only result in a small and negligible signal power drop among users with local zero-forcing. In addition, local precoding makes it possible to have non-coherent JT where each participating cell site transmits signals to the CoMP UE incoherently, where the phase accuracy is very poor or non-existent.

Other advantages provided by the local precoding schemes include scheduling flexibility (both distributed and centralized scheduling are now possible vs. only centralized scheduling for global precoding) and the ability to provide a hybrid system which includes single-user joint-transmission (SU-JT) and multi-user joint-transmission (MU-JT). SU-JT can be treated as a special case for local precoding schemes. More particularly, in a local precoding scenario, if the number of served links in each cell is capped at 1, then all the scheduled UEs are either SU-MIMO JT or SU-MIMO non-JT. For example, there are four cells cooperating to serve three UEs. Two of the cells are serving one UE cooperatively as SU-MIMO JT, and each of the other two cells is serving one UE as SU-MIMO JT. Because all cells are operating in single-user mode, zero-forcing precoding is no longer needed; only the two cells that serve the same UE need to make sure their signals constructively interfere with each other at the UE, if coherent JT is used. Note that, for SU-JT cases, although ZF-precoding is no longer needed, opportunistic or explicit CBF-types of techniques can be applied among different cells because all cells are cooperating. In a SU/MU-JT hybrid system, some cells in the CoMP set are involved in SU-JT and some cells are involved in MU-JT. Hence, it is possible to limit the co-paired interference to some designated UEs by applying SU-JT while achieving multi-user gains in other cells. In contrast, in the global precoding schemes, all the users in the CoMP set experience MU-MIMO. In fact, for CoMP JT system implementing global precoding, MU-MIMO transmission is required to prevent the system from significant loss of capacity. On the other hand, for CoMP JT system implementing localized (or per-cell-based) precoding, both MU-MIMO and SU-MIMO (or even non-MIMO) can be used.

Figure 3:
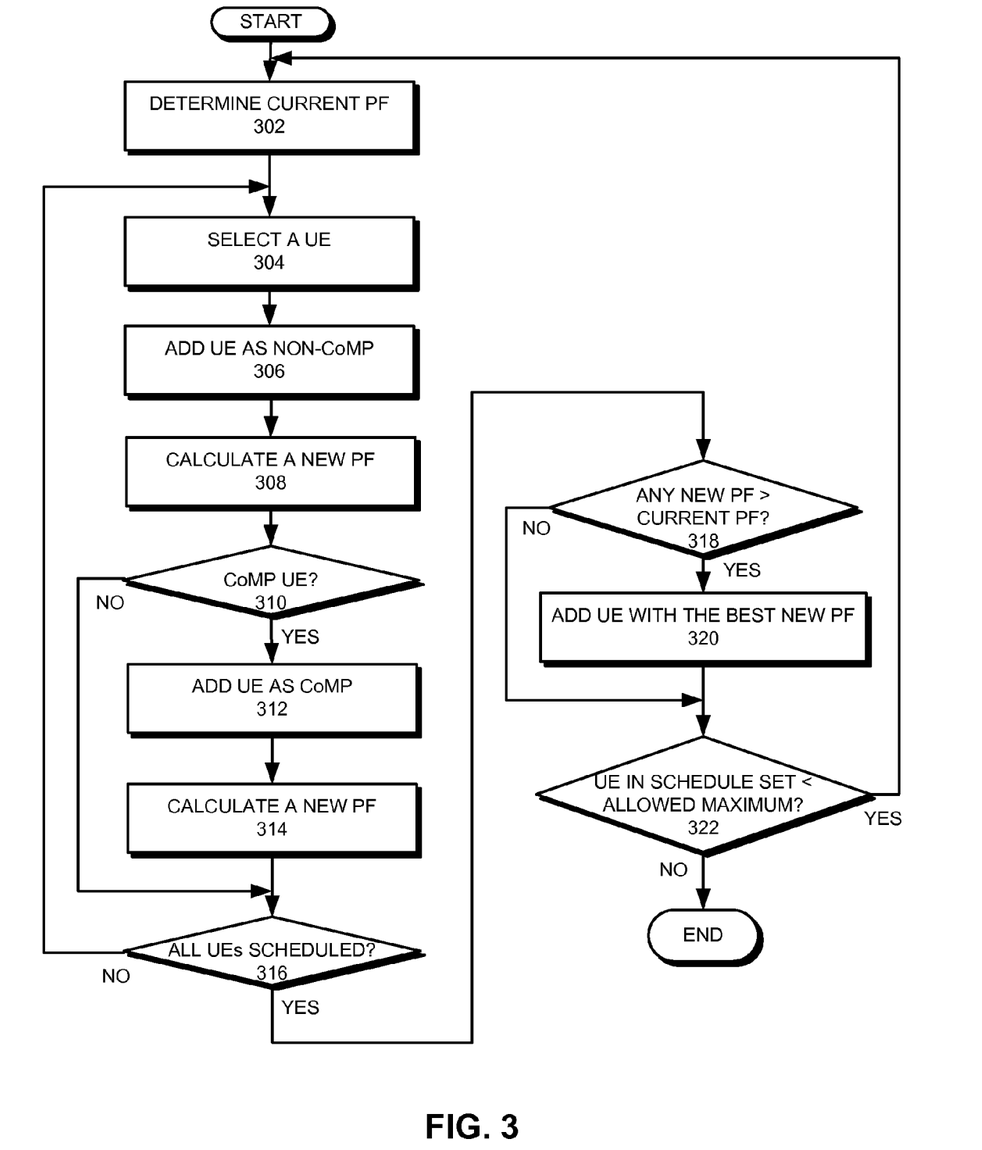
FIG. 3 presents a diagram illustrating an exemplary process of the CoMP JT scheduler, in accordance with an embodiment of the present invention.

In addition, local precoding can significantly reduce the scheduler complexity. FIG. 3 presents a diagram illustrating an exemplary process of the CoMP JT scheduler, in accordance with an embodiment of the present invention. During operation, the scheduler determines the proportional fairness (PF) value for the current assigned users (operation 302). Note that when no user has been scheduled, the PF value is 0. Then, the scheduler selects a UE not yet scheduled (operation 304), adds the UE as a non-CoMP UE to the schedule list (operation 306), and calculates a corresponding new PF value (operation 308). Subsequently, the scheduler determines whether the UE is suitable for CoMP (operation 310). Various different criteria can be used to make the determination, including, but not limited to: channel knowledge associated with the UE and the scheduler utility function. More specifically, the scheduler needs to make sure that enough gain can be obtained by scheduling a UE for CoMP to justify the degree of freedom (DoF) occupied. In general, only UEs which experience interference that is comparable to the signal remain as CoMP. As the user experience improves, it is less likely that the UE is scheduled as CoMP. This can lead to a pre-selection criterion for CoMP candidate UEs. In one embodiment, the scheduler pre-selects UEs with short-term signal to interference ratio (SIR) less than a threshold (such as 3 dB) as CoMP candidates. This pre-filtering process can reduce the scheduling complexity without affecting the overall performance. Note that, in the scheduling process, some UEs may have been initially assigned for CoMP but would be re-assigned as non-CoMP later when the number of scheduled UEs in the same time/frequency resource increases. If it is determined that the UE can be CoMP, the scheduler adds the UE as a CoMP UE to the schedule list (operation 312), and calculates a corresponding new PF value (operation 314). Otherwise, the scheduler advances to the operation that determines whether all UEs have been scheduled (operation 316). If not, the scheduler selects a next UE (operation 304). If so, the scheduler determines whether any of the new PF values is better than the current PF value (operation 318). If so, the scheduler adds the UE that generates the best new PF value to the schedule set (operation 320). Otherwise, the scheduler determines whether the number of UEs in the schedule set is less than the maximum allowed value (operation 322). If so, the scheduler returns to operation 302. Otherwise, the scheduler completes the scheduling process.

Once the scheduler completes scheduling, the system can calculate local precoders in accordance with CSI associated with the paired UEs. Note that a local precoding calculation for a cell considers only the paired UEs within the cell and the CoMP UEs of other cells that receive CoMP JT signals from the current cell. Note that channel information associated with the CoMP UEs is exchanged among the cells to facilitate the local precoding calculation.

Power Assignment

Other than precoding techniques, the system performance can also be improved by assigning UE-specific transmit power. For example, proportional fairness (PF) power assignment can be used to improve performance. However, in the global precoding cases, PF power assignment can introduce power-pooling issues where power assigned to one transmitter may exceed its maximum allowed power. With local precoding, this problem can be avoided. Because local precoding calculation does not rely on inter-cell phase or amplitude information, there is no need to have a unified power budget for the entire CoMP JT system. Instead, a local power budget can be applied to each cell. For example, one can apply a normalization factor to set power for each cell individually.

In one embodiment, for PF power assignment, transmit power to each user is set inversely proportional to the experienced average rate of that user. Note that the assigned power for a CoMP UE is divided among the co-serving cells in accordance with the reference signal received power (RSRP) of the co-serving cells. Specifically, the division is linearly proportional to the RSRP.

Figure 4:
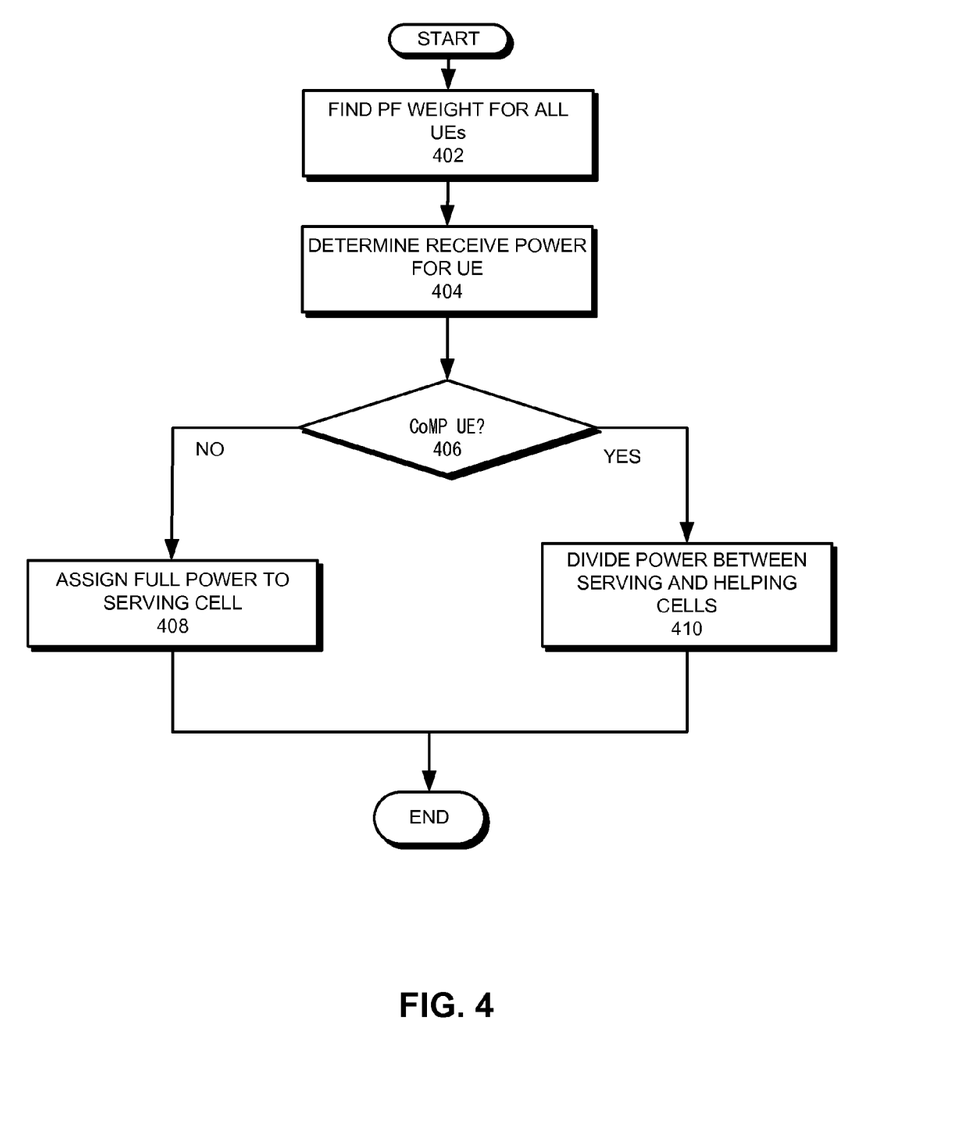
FIG. 4 presents a diagram illustrating an exemplary process for setting transmit power for a UE, in accordance with an embodiment of the present invention

FIG. 4 presents a diagram illustrating an exemplary process for setting transmit power for a UE, in accordance with an embodiment of the present invention. During operation, the system finds the PF weight for all scheduled UEs (operation 402). The PF weight for a scheduled UE i is $W_i$. The system then determines power received at each UE (operation 404). For UE i, the received power is $P*W_i/\Sigma W_i$, where P is the total transmit power. The system subsequently determines whether the UE is CoMP (operation 406). If not, the system assigns the serving cell of the UE to transmit at the determined power level to the UE (operation 408). If the UE is a CoMP UE, the system divides the determined receive power between the serving and helping cells in accordance with the short-term RSRP reported by the UE for each cell (operation 410). In other words, the serving cell and the helping cell of that UE both provide a portion of the determined receive power to the UE.

Hybrid Global/Local Precoding

In addition to performing strict local precoding, it is also possible to have a hybrid system which includes a mixture of cells that implement global precoding and cells that implement local precoding. For example, for a CoMP set that includes both intra-site cells and inter-site cells, it is possible to apply global precoding on the intra-site cells while applying local precoding on the inter-site cells. Moreover, even for the inter-site cells, the system can group certain cells into a large virtual cell and apply global precoding for cells in the virtual cell. In one embodiment, the system groups cells into different virtual cells in accordance with the accuracy of the feedback, the synchronization accuracy, and the UEs' capabilities for interference rejection.

In some embodiments, the system determines whether to implement global precoding or local precoding in accordance with current conditions. Various criteria can be used by the system while deciding between global and local precoding, including but not limited to: the speed/capacity of the backhaul network that interconnects the BSs, the availability of the centralized processing capability, synchronization accuracy between cooperating transmitting points, and channel sounding accuracy. For example, if synchronization error among cells is relatively high, the system can apply local precoding to each individual cell. On the other hand, if synchronization among multiple cells is sufficiently accurate, the system can group these cells into a virtual cell and apply global precoding for the virtual cell. Moreover, when there is poor synchronization among cells, the system may switch to non-coherent JT or apply spatial/power-domain interference mitigation techniques (such as using space-time coding) to improve overall performance. To do so, signaling on the X2 interface among BSs is needed. To facilitate the adaptation between local and global precoding schemes, in some embodiments, the system uses X2 signaling (or signaling on the X2 interface) to coordinate the CoMP precoding schemes among cooperating transmit points.

Modules and System

Figure 5:
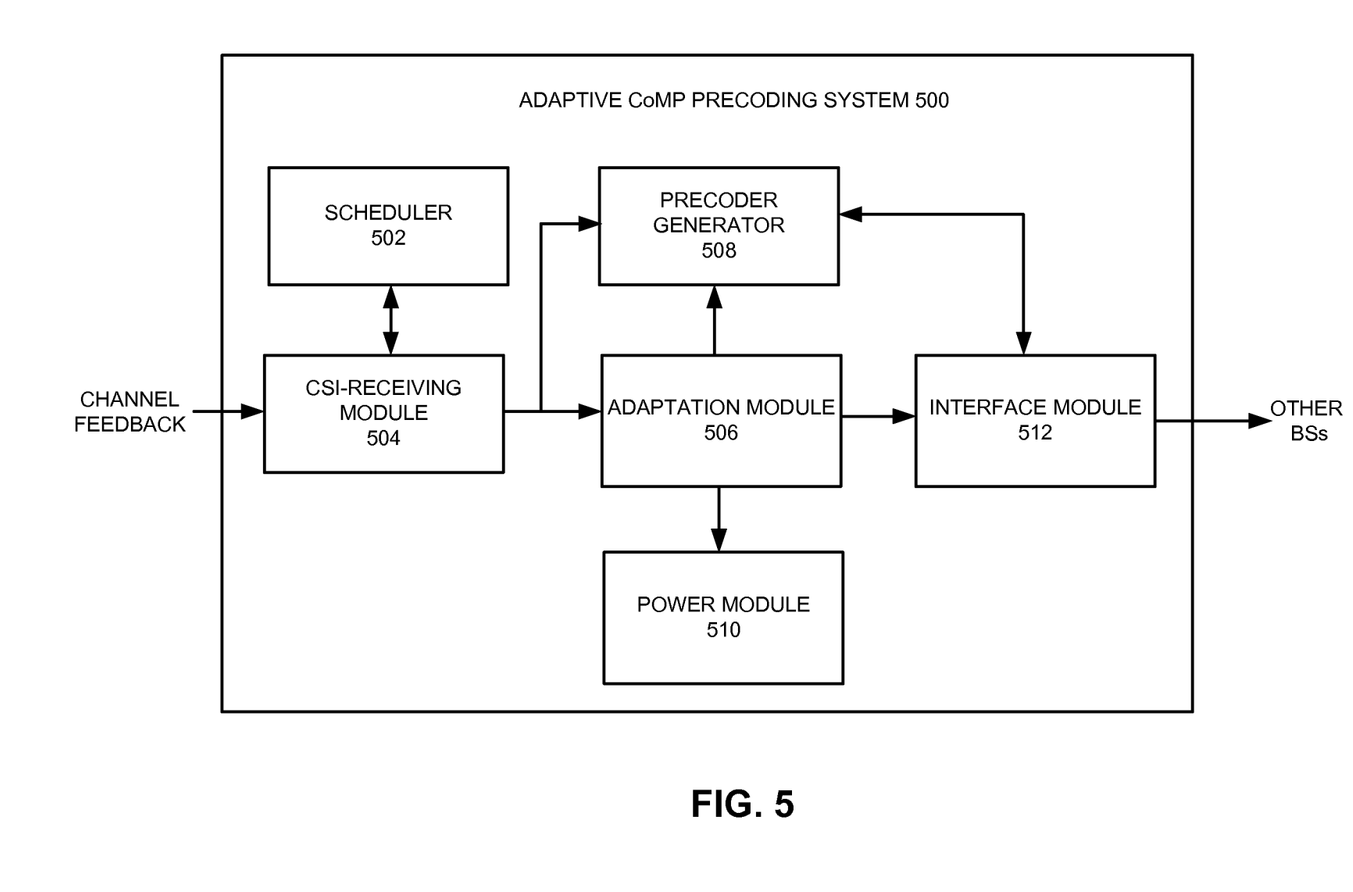
FIG. 5 presents an exemplary system for performing adaptive CoMP JT precoding, in accordance with an embodiment of the present invention.

FIG. 5 presents an exemplary system for performing adaptive CoMP JT precoding, in accordance with an embodiment of the present invention. An adaptive CoMP precoding system 500 includes a scheduler 502, a CSI-receiving module 504, an adaptation module 506, a precoder generator 508, a power module 510, and an interface module 512.

Scheduler 502 is responsible for pairing UEs in accordance with their spatial diversity. In one embodiment, scheduler 502 uses a proportional-fairness scheduling algorithm. In addition, scheduler 502 is responsible for determining whether certain UEs are CoMP. CSI-receiving module 504 is responsible for receiving CSI for channels between the transmitting BSs (in the case of CoMP, the cluster of BSs) and the UEs. In one embodiment, the CSI or channel matrix is obtained in accordance with channel feedback signals transmitted from the corresponding UEs.

Adaptation module 506 determines whether the current cell can participate in the global precoding of a group of cells or if it is better to perform local precoding for the current cell. In one embodiment, adaptation module 506 makes the determination in accordance with a number of factors, including but not limited to: backhaul speed/capacity, processing capability, synchronization accuracy, and feedback accuracy.

In accordance with the adaptation decision and the CSI, precoder generator 508 generates appropriate precoders. In one embodiment, zero-forcing precoders are generated.

Power module 510 is responsible for power assignment to the UEs. If the system is in the local precoding mode, power module 510 does not need to resolve the power pooling issue, and can simply assign power to non-CoMP UEs in accordance with their PF weight. To a CoMP UE, power module 510 divides the power between the serving cell and the helping cell of the CoMP UE. If the system is in the global precoding mode, power module 510 needs to resolve the power pooling. In some embodiments, power back-off may be performed to certain UEs.

Interface module 512 provides interface among BSs. In some embodiments, partial CSI information is exchanged among cells via interface module 512. In a further embodiment, if the system is in local precoding mode, only CSI information associated with CoMP UEs is exchanged between neighboring cells. If the system is in global precoding mode, full CSI information is exchanged. Moreover, X2 signaling is also exchanged via interface module 512 to coordinate the various CoMP precoding schemes between the cooperating cells.

Figure 6:
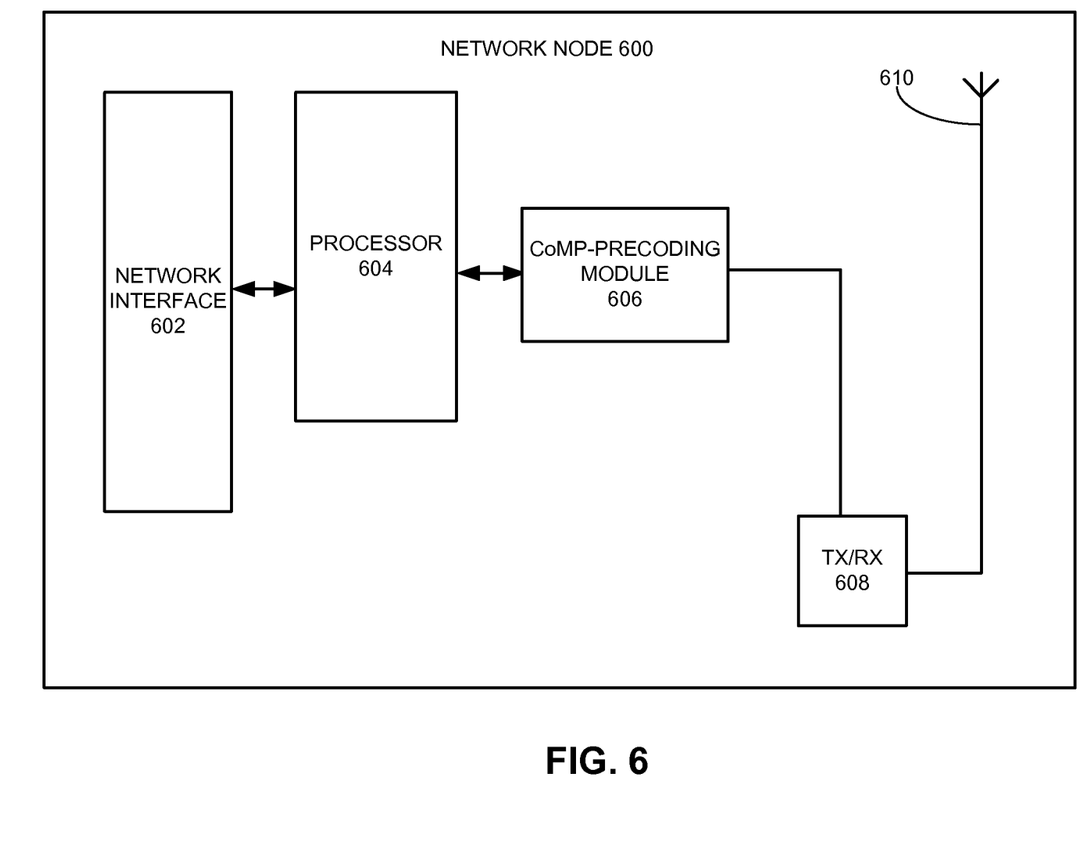
FIG. 6 presents a diagram illustrating the architecture of an exemplary network node, in accordance with an embodiment of the present invention

FIG. 6 presents a diagram illustrating the architecture of an exemplary network node, in accordance with an embodiment of the present invention. A network node 600 includes a network interface 602, a processor 604, a CoMP-precoding module 606, a transceiver 608, and an antenna 610. During operation, network node 600 interacts with the core network via network interface 602. Processor 604 executes applications for CoMP-precoding module 606. Transceiver 608 receives uplink signals from and transmits downlink signals to other nodes via antenna 610. While transmitting downlink signals, transceiver 608 applies the precoder generated by CoMP-precoding module 606.

Embodiments of the present invention provide a method and a system for achieving efficient precoding in a CoMP JT system. By applying precoding locally, such as per-transmit-point, embodiments of the present invention simplify the implementation of eNode-Bs for CoMP. In addition, it is possible to enable CoMP with a lowered synchronization requirement, thus lowering the synchronization cost of the system and improving robustness of the system with the lowered synchronization constraints. Moreover, application of the local precoding schemes also lowers the backhaul requirement for CoMP as less data and signaling need to be exchanged among eNode-Bs. As a result, the backhaul operational expenditure (OPEX) is also lowered.

Note that the process shown in FIGS. 3-4 and the block diagrams shown in FIGS. 5-6 are merely exemplary and should not limit the scope of this disclosure. For example, the system and node shown in FIGS. 5 and 6 may have more or fewer components. In addition, this disclosure uses the zero-forcing precoding as an example. In practice, other types of precoding, such as dirty paper coding (DPC), can also be used as long as the downlink performance is improved.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   identifying, at a first transmit point of an intra-site first cell, a first set of user equipments (UEs), which are located within the first cell and capable of receiving signals from the first transmit point;
   identifying a second set of UEs, which are located within an inter-site second cell and capable of receiving signals from both the first transmit point of the first cell and a second transmit point of the second cell;
   obtaining a first channel state information (CSI) associated with the first set of UEs;
   receiving a second CSI associated with the second set of UEs; and
   scheduling transmission for the first cell in accordance with the first CSI and the second CSI by applying global precoding on the intra-site first cell and applying local precoding on the inter-site second cell.

2. The method of claim 1, further comprising:
   determining whether one or more conditions associated with the first transmit point and the second transmit point have been met; and
   in response to the conditions being met, constructing a global precoder for the first cell and the second cell.

3. The method of claim 2, wherein the one or more conditions include:
backhaul capability between the first transmit point and the second transmit point substantially satisfying a need;
available processing capability exceeding a threshold;
synchronization level between the first transmit point and the second transmit point exceeding a threshold; and
channel feedback information for the first cell and the second cell being substantially accurate.

4. The method of claim 2, wherein constructing the global precoder involves signaling on an X2 interface between the first transmit point and the second transmit point.

5. The method of claim 1, wherein the first transmit point and the second transmit point are located at different cell sites.

6. The method of claim 1, further comprising:
assigning power transmitted from the first transmit point to the set of UEs independently of power assignment in the second cell.

7. A method, comprising:
identifying, at a first transmit point of an intra-site first cell, a first set of user equipments (UEs), which are located within the first cell and capable of receiving signals from the first transmit point;
identifying a second set of UEs, which are located within an inter-site second cell and capable of receiving signals from both the first transmit point of the first cell and a second transmit point of the second cell;
obtaining a first channel state information (CSI) associated with the first set of UEs;
receiving a second CSI associated with the second set of UEs;
scheduling transmission for the first cell in accordance with the first CSI and the second CSI; and
splitting power transmitted to the second set of UEs between the first transmit point and the second transmit point in accordance with corresponding reference signal received powers (RSRPs) reported by the second set of UEs.

8. The method of claim 1, wherein the scheduling transmission for the first cell comprises constructing a local zero-forcing precoder such that both the first cell and the second cell can transmit signals to one of the UEs in the second set of UEs incoherently.

9. A system, comprising:
a processor; and
a coordinated multipoint transmission precoding module coupled to the processor and configured to:
identify, at a first transmit point of an intra-site first cell, a first set of user equipments (UEs), which are located within the first cell and capable of receiving signals from the first transmit point;
identify a second set of UEs, which are located within an inter-site second cell and capable of receiving signals from both the first transmit point of the first cell and a second transmit point of the second cell;
obtain a first channel state information (CSI) associated with the first set of UEs;
receive a second CSI associated with the second set of UEs; and
schedule transmission for the first cell in accordance with the first CSI and the second CSI by applying global precoding on the intra-site first cell and applying local precoding on the inter-site second cell.

10. The system of claim 9, wherein the precoding module is further configured to:
determine whether one or more conditions associated with the first transmit point and the second transmit point have been met; and
in response to the conditions being met, construct a global precoder for the first cell and the second cell.

11. The system of claim 10, wherein the one or more conditions include:
backhaul capability between the first transmit point and the second transmit point substantially satisfying a need;
available processing capability exceeding a threshold;
synchronization level between the first transmit point and the second transmit point exceeding a threshold; and
channel feedback information for the first cell and the second cell being substantially accurate.

12. The system of claim 10, wherein while constructing the global precoder, the precoding module is further configured to signal on an X2 interface between the first transmit point and the second transmit point.

13. The system of claim 9, wherein the first transmit point and the second transmit point are located at different cell sites.

14. The system of claim 9, wherein the precoding module is further configured to assign power transmitted from the first transmit point to the first set of UEs independently of power assignment in the second cell.

15. A system, comprising:
a processor; and
a coordinated multipoint transmission precoding module coupled to the processor and configured to:
identify, at a first transmit point of an intra-site first cell, a first set of user equipments (UEs), which are located within the first cell and capable of receiving signals from the first transmit point;
identify a second set of UEs, which are located within an inter-site second cell and capable of receiving signals from both the first transmit point of the first cell and a second transmit point of the second cell;
obtain a first channel state information (CSI) associated with the first set of UEs;
receive a second CSI associated with the second set of UEs;
schedule transmission for the first cell in accordance with the first CSI and the second CSI; and
wherein the precoding module is further configured to split power transmitted to the second set of UEs between the first transmit point and the second transmit point in accordance with corresponding reference signal received powers (RSRPs) reported by the second set of UEs.

16. The system of claim 9, wherein while scheduling transmission for the first cell, the precoding module is further configured to construct a local zero-forcing precoder such that both the first cell and the second cell can transmit signals to one of the UEs in the second set of UEs incoherently.

17. A node in a wireless network, the node comprising:
a scheduler configured to identify an intra-site first set of user equipments (UEs), which are located within a first cell and capable of receiving signals from a first transmit point of the first cell;
a CSI-receiving mechanism configured to:
receive a first channel state information (CSI) associated with the first set of UEs; and
receive a second CSI associated with an inter-site second set of UEs from a second transmit point of a second cell, wherein the second set of UEs are capable of receiving signals from both the first transmit point and a second transmit point;
a selection mechanism configured to select a scheduler utility function associated with the identified UEs; and a local precoder generator configured to generate a local precoder for the first cell in accordance with the first CSI and the second CSI by applying global precoding on the intra-site first cell and applying local precoding on the inter-site second cell.

18. The node of claim 17, further comprising:
a determination mechanism configured to determine whether one or more conditions associated with the first transmit point and the second transmit point have been met; and
a global precoder generator configured to, in response to the conditions being met, generate a global precoder for the first cell and the second cell.

19. The node of claim 18, wherein the one or more conditions include:
backhaul capability between the first transmit point and the second transmit point substantially satisfying a need;
available processing capability exceeding a threshold;
synchronization level between the first transmit point and the second transmit point exceeding a threshold; and
channel feedback information for the first cell and the second cell being substantially accurate.

20. The node of claim 18, further comprising an X2 interface configured to exchange signaling between the first transmit point and the second transmit point, thereby facilitating the generation of the global precoder.

21. A node in a wireless network, the node comprising:
a scheduler configured to identify an intra-site first set of user equipments (UEs), which are located within a first cell and capable of receiving signals from a first transmit point of the first cell;
a CSI-receiving mechanism configured to:
receive a first channel state information (CSI) associated with the first set of UEs; and
receive a second CSI associated with an inter-site second set of UEs from a second transmit point of a second cell, wherein the second set of UEs are capable of receiving signals from both the first transmit point and a second transmit point;
a selection mechanism configured to select a scheduler utility function associated with the identified UEs;
a local precoder generator configured to generate a local precoder for the first cell in accordance with the first CSI and the second CSI;
a power module configured to:
assign power transmitted from the first transmit point to the first set of UEs independently of power assignment in the second cell; and
split power transmitted to the second set of UEs between the first transmit point and the second transmit point in accordance with corresponding reference signal received powers (RSRPs) reported by the second set of UEs.

22. The node of claim 17, wherein the precoder is a zero-forcing precoder configured such that both the first cell and the second cell can transmit signals to one of the UEs in the second set of UEs incoherently.

* * * * *